A. C. SARGENT.
MECHANISM FOR OPERATING BRAKES, CLUTCHES, AND THE LIKE.
APPLICATION FILED NOV. 20, 1916.
1,246,330. Patented Nov. 13, 1917.
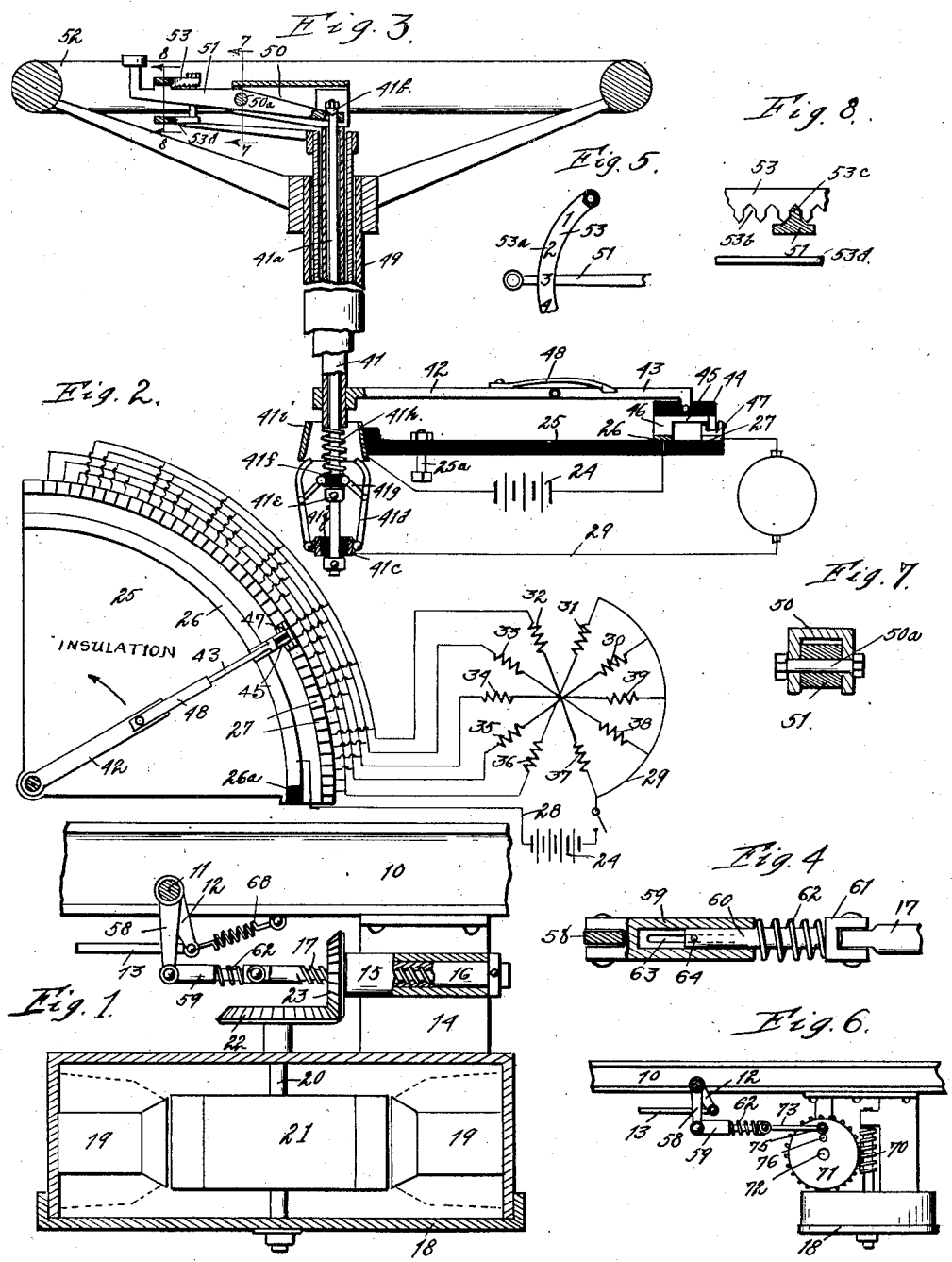

UNITED STATES PATENT OFFICE.

ALSON C. SARGENT, OF DES MOINES, IOWA.

MECHANISM FOR OPERATING BRAKES, CLUTCHES, AND THE LIKE.

1,246,330.  Specification of Letters Patent.  Patented Nov. 13, 1917.

Application filed November 20, 1916. Serial No. 132,501.

*To all whom it may concern:*

Be it known that I, ALSON C. SARGENT, a citizen of the United States, and resident of Des Moines, in the county of Polk and State of Iowa, have invented a certain new and useful Mechanism for Operating Brakes, Clutches, and the like, of which the following is a specification.

The object of my invention is to provide means of comparatively simple, and inexpensive construction, whereby power may be provided for operating and controlling a movable member connected with a clutch, brake or the like, for moving said member in opposite directions, and for holding it in any of its positions.

A further object is to provide a form of such device having parts especially adapted to be controlled from a position readily accessible to the driver of a motor vehicle.

A further object is to provide in a mechanism of the kind mentioned, a movable member, a screw operatively connected therewith, a power device for operating said screw, the parts being so arranged that when the screw is moved to any of its adjusted positions and the application of power is stopped, the screw will remain in its adjusted position until the power is further applied.

A further object is to provide in connection with such mechanism cushioning means whereby the power is yieldingly applied to the movable member.

A further object is to provide in such a mechanism employing a screw, as above set forth, means whereby wear on the mechanism is automatically taken care of by the screw.

A further object is to provide such a device capable of being operated by the operation of a single lever or the like.

A further object is to provide in such a device, means for automatically breaking the electric circuit when the movable member has reached any desired position of its movement, the parts being so arranged that the movable member will be held in such position without any consumption of electrical energy.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of the motor and gearing devices constituting part of my invention, parts being shown in section.

Fig. 2 shows a detail view of the commutator, the motor being shown in diagram.

Fig. 3 shows a vertical, sectional view of a steering gear with parts of my mechanism installed thereon.

Fig. 4 shows a detail, sectional view of part of the mechanism for connecting the screw with the movable member.

Fig. 5 shows a top or plan view of the quadrant adjacent to the controlling mechanism of my device.

Fig. 6 shows a detail view of a modified form of the mechanism.

Fig. 7 shows a vertical, sectional view taken on the line 7—7 of Fig. 3, and

Fig. 8 shows a vertical, sectional view taken on the line 8—8 of Fig. 3.

It may be explained at this time that the power plant used in connection with my mechanism may have a variety of forms and the electric motor shown herewith, while a preferred power plant may be dispensed with and another suitable power plant used in its place.

It should also be mentioned that it is my object to apply my mechanism to various devices such for instance, as a brake, a clutch, an elevator or the like, and I have shown in my drawing simply illustrative forms of my mechanism.

In the drawings herewith, I have used the reference numeral 10 to indicate generally a form which may be part of the frame of a motor vehicle.

Mounted on the frame is a rock shaft 11, on which is fixed an arm 12 to which is pivoted a link or movable member 13. The link 13 may be connected with a clutch, brake, or other suitable mechanism. The screw, hereinafter referred to, may be connected with a movable member in various other ways than those here shown.

Suitably mounted on the frame 10 is a bracket 14 on which is supported a cylindrical bearing 15. Mounted in the bearing 15 is a sleeve 16 having a longitudinally screw-threaded opening therein.

Received within the sleeve 16 is a screw 17 which projects at one end considerably beyond the sleeve 16.

Suitably mounted is a power plant, which in the form of my invention, comprises an electric motor having a case 18 in which are mounted a plurality of field cores 19 in a circle within the case 18, and wired so that said cores are connected in opposite pairs of opposite polarity.

Suitably mounted in the case 18 is a motor shaft 20, on which is a double ended armature 21 adapted to rotate. On the shaft 20 is a beveled gear 22 in mesh with a beveled gear 23 on the sleeve 16.

Suitably located is a source of electrical energy 24. In connection with my motor, I preferably use a commutator of peculiar construction such for instance as that shown in my application for patent Serial Number 84,463, filed March 6, 1916. This commutator comprises a suitable base 25, on which is a strip of conducting material 26, which may be arranged in the arc of a circle, as shown in Fig. 2.

A plurality of segments 27 are arranged in succession, preferably in a row parallel with the strip 26 and are separated by suitable insulation.

The source of power 24 is connected with the strip 26 by a wire 28. The source of power 24 is connected by a wire 29 with the wirings of the field cores of one-half of the motor, as shown in Fig. 2, the automatic switch being connected with parts of said wire 29.

In Fig. 2, I have indicated the wiring of the field cores by the reference characters 30, 31, 32, 33, 34, 35, 36, 37, 38 and 39. The wire 29 is connected with the wirings 37, 38, 39, 30 and 31. The wiring 36 on one of the field cores is connected as shown, with the second and third segments 27 from one end of the row thereof, and with each fifth segment from the third. The wiring 35 is connected with the fourth segment from the end and with each fifth segment 27. The wiring 34 is connected with the fifth segment 27 from the end and with each fifth segment 27 therefrom. The wiring 33 is connected with the sixth segment 27 from the end and with each fifth segment therefrom. The wiring 32 is connected with the seventh segment 27 from the end and with each fifth segment therefrom.

In Fig. 3, I have shown an upright hollow shaft 41 adapted to rotate.

The support for the commutator is stationary, and may be secured to a fixed part of the frame of the machine by means of a bolt 25$^a$.

Fixed to the shaft 41 is a laterally extending arm 42 to which is pivoted a brush holding arm 43. Secured to the outer end of the arm 43 is a block of insulation 44 to which is secured a brush 45 having a downward extension 46 adapted to contact with, and slide along the strip 26.

Pivoted to another portion of the brush 45 is a brush member 47 of such size as to extend across two of the segments 27 from end to end thereof.

Secure to the arm 42 is a spring 48, the outer end of which engages the arm 43 for yieldingly holding the members of the brush 45 in contact with the strip 26 and the segments 27.

The shaft 41 is mounted in the steering sleeve 49 of a motor vehicle. At the upper end of the shaft 41 is a lever 50 in the form of a downwardly opening channel, extending laterally from the shaft 41.

Pivoted on the bolt 50$^a$ extended through the walls of the lever 50 is a lever 51, one end of which is received within the channel-shaped lever 50, and the other end of which projects outwardly therefrom adjacent to the steering wheel 52.

Adjacent to the lever 51 is a quadrant 53. Vertically slidable within the shaft 41 is an upright shaft or rod 41$^a$, the upper end of which is suitably pivoted to the end of the lever 51, which is secured to the rod 41$^a$ by a joint 41$^b$ of such form as to permit proper play of the parts. Near the outer end of the lever 51 is a quadrant 53 on which are indicating characters 53$^a$ for showing to the user of the machine the relative positions of the brake or clutch or other mechanism to be operated.

The quadrant has on its lower surface a plurality of notches 53$^b$ to receive an upwardly extending lug 53$^c$ on the lever 51. Below the quadrant 53 is a quadrant 53$^d$ which limits the downward movement of the outer end of the lever 51. At the lower end of the rod or shaft 41$^a$ is fixed a collar 41$^e$ of insulating material, surrounding which is a current conducting ring 41$^c$. Pivoted to the ring 41$^c$ on opposite sides thereof are upwardly extending arms 41$^d$ the upper ends of which curve toward the rod 41$^a$. On the rod 41$^a$ between the arms 41$^d$ is fixed a collar 41$^e$. Above the collar 41$^e$ is slidably mounted a collar of insulation 41$^f$. Pivoted to the collar 41$^f$ on opposite sides thereof are short links 41$^g$. The lower ends of the links 41$^g$ are pivoted to the respective arms 41$^d$. The rod 41$^a$ extends downwardly below the lower end of the shaft 41.

Mounted on the rod 41$^a$ between the collar 41$^f$ and the lower end of the shaft 41 is a coil spring 41$^h$, which yieldingly holds the collar 41$^f$ at the lower limit of its movement against the collar 41$^e$ for holding the upper ends of the arms 41$^d$ spaced apart from each other and adjacent to the member 41$^i$. The spring 41$^h$ also tends to hold the rod 41$^a$ in its lower position of movement.

Suitably mounted, surrounding the spring 41ʰ, is a bell-shaped member 41ⁱ, having its lower end extending downward and near the upper ends of the arm 41ᵈ, when the rod 41ᵃ is in its lower position. It will be seen that the device, just described, forms a switch, the operation of which will be hereinafter described.

Fixed on the rock shaft 11 is an arm 58 (Fig. 1).

Pivotally connected with the screw 17 is a forwardly extending rod 60, which is slidably received within a sleeve 59. The sleeve 59 is pivoted to the arm 58. The sleeve 59 is provided with an elongated slot 63 in which travels a pin 64 extending outwardly from the rod 60. The rod 60 has near its pivoted end a shoulder 61. A coil spring 62 is mounted on the rod 60 between the shoulder 61 and the sleeve 59.

In Fig. 6, I have shown a slightly modified form of my device in which the motor shaft 20 is provided with a worm 70 in mesh with a worm gear 71 on a short shaft 72.

Where the form of my device shown in Fig. 6 is employed, the rod 60 is connected with the worm gear 71 by means of a pitman 73 pivoted to the said rod 60 and pivoted off center to the worm gear 71, by means of a crank pin 75 selectively received in one of a plurality of openings 76. By mounting the crank pin 75 in different openings 76, the stroke of the pitman may be regulated as desired and adjustment may be made to allow for wear of the parts.

A coil spring 68 may be provided for yieldingly holding the arm 12 at one limit of its movement, to prevent accidental operation of the member 13 by vibration or otherwise.

I will now describe the practical operation of my device.

I am assuming that my device has been made in the proper form for installation on a motor vehicle. This is done simply for the purpose of illustrating an operative form of the device.

I assume that the movable member 13 is operatively connected with a band-brake or clutch or the like.

It will be noted that the strip 26 terminates at one end at such a point that when the brush member 47 touches the third segment 27, the brush member 46 contacts with the strip 26 and there will be no consumption of current until such contact is made. Adjacent to said end of the strip 26 is a short strip 26ᵃ of insulating material for supporting the brush member 46.

It will be seen that when the armature 21 is rotated in one direction, the sleeve 16 will be rotated for moving the screw 17 longitudinally, thereby, through the arm 58, the rock shaft 11, and the arm 12, causing movement of the movable member 13.

Undue wear or shock of the machinery is taken care of by means of the spring 62. When the direction of motion of the armature is reversed, by reversing the movement of the brush, the sleeve 16 is operated to move the screw 17 in the opposite direction from that mentioned above, whereby the movable member 13 is moved in the opposite direction from that hereinbefore referred to. It will be noted in this connection that if there should be wear on the parts in case my device be used with a brake or the like, this wear is automatically taken up and accounted for by simply moving the brush to the proper position, thereby rotating the armature a little farther for the purpose of moving the screw to a position for accomplishing the desired purpose.

Assuming that the parts of my device, as hereinbefore described, are installed upon a motor vehicle, the operation is as follows:—

It should be said that the bell-shaped member 41ⁱ and the ring 41ᶜ are connected with parts of the wire 29.

When the parts are in their normal positions, weight of the rod 41ᵃ and action of the spring 41ʰ is such as to hold the inner end of the lever 51 in its lower position and hold the lug 53ᶜ on said lever received within one of the notches 53ᵇ to prevent accidental movement of the lever 51, which would tend to rotate the shaft 41 for moving the brush 45.

The lever 51 is normally left in position where the brush 45 will stand above the first two segments 27 and above the strip 26ᵃ. When the outer end of the lever 51 is lowered to its limit of movement as determined by the quadrant 53ᵈ, the rod 41ᵃ is raised, thereby bringing the upper ends of the arms 41ᵈ into contact with the interior of the bell-shaped member 41ⁱ which is of conducting material, and the spring 41ʰ holds said arms 41ᵈ firmly in contact with said bell-shaped member. When the lever 51 is then swung laterally or around the steering post 49, it carries with it the lever 50, thereby rotating the shaft 41 and moving the arms 42 and 43 for moving the brush over the commutator.

When the lever 51 is moved for moving the brush in the direction indicated by the arrow in Fig. 2, until the brush contacts with the second and third segments 27 and with the strip 26, a circuit will be closed through the second and third segments 27, the wirings 36 and 31 of a pair of cores 19, the wire 29, the switch member 41ⁱ, the arms 41ᵈ, the source of energy 24, the wire 28, the strip 26 and the brush. There will, however, at that time be no tendency to move the armature, the ends of which will be opposite the cores having the wires 36 and 31. A magnetic field will be established through the armature 21, the core having the wirings 36, the inner end of which is north, and through the core 31, the inner end of which is south. At the outer ends of the energized cores, the magnetic field, as it were, divides and travels around the casing 18 in both directions from the outer ends of the cores.

When the brush moves a little farther, and the member 47 contacts with the third and fourth segments 27, then a circuit will be established through the switch, the source of power 24, through the wire 29, the wirings 30 and 35, the fourth segment 27, the brush, the strip 26, and the return wire 28. A circuit is also established, as clearly shown by the diagram in Fig. 2, through the wirings 31 and 36, and the third segment 27. A magnetic field is thereby created through the cores having the wirings 35 and 36, through one end of the armature and through a portion of the outer casing, and another magnetic field is created through the cores having the wirings 30 and 31 and the other end of the armature and another portion of the casing 18.

The armature will have been moved from its position with its ends opposite the cores having the wirings 31 and 36 to position where its ends are opposite and substantially cover the inner ends of the cores having the wirings 36 and 35, and the cores having the wirings 30 and 31. Similar operations may be made successively until the brush has moved the full distance of its possible movement in the direction indicated by the arrow in Fig. 2.

The movement of the brush is controlled by the lever 51 as desired, and when the brush reaches a position in contact with the thirteenth and fourteenth segments 27, the armature will have made a complete revolution.

It will be seen that the possible number of continuous revolutions of the armature in one direction without reversing its direction of movement, is limited only by the number and arrangement of the segments 27 and the arrangement of the strip 26. It will be seen that only a quarter circle of said segments has been really shown, but by making a complete circle thereof, the lever 51 may be manipulated for securing any desired number of revolutions of the armature in either direction.

It may be noted that there are times when the ends of the armature are opposite three core ends, because the brush contacts with parts of three segments 27. For illustration, one of the armature ends may be opposite the inner ends of the cores having the wirings 34, 35, and 36, and the other end of the armature may be opposite the cores 39, 30 and 31. In such case, a magnetic field will be established through a portion of one armature end, through the cores 35 and 36, and a portion of the casing. Another magnetic field will be established through a portion of the same armature end, through the cores having the wirings 34 and 35 and through a portion of the casing. At the same time a magnetic field is created through the other end of the armature, through the cores having the wirings 39 and 30 and through a portion of the casing. Another magnetic field is created through the last mentioned end of the armature, through the cores having the wirings 30 and 31 and through a portion of the casing. This makes it possible to secure a more accurate and steady control of the armature, for the reason that while the brush is being moved, a magnetic lead for the movement of the armature is maintained.

The indicating characters on the segment 53 are so located as to readily show the operator when the motor has been moved to position for controlling the screw for setting the brake, operate the clutch, or accomplish the mechanical purpose desired.

When the brush is moved to a certain position, and stopped, it will be obvious that on account of the nature of the screw, the movable member will be held in its position until it is again moved by the operation of the device.

When the lever 51 is moved for returning the brush to its original or starting position, the direction of rotation of the armature is reversed, thereby reversing the direction of operation of the screw and returning the various parts toward their original positions.

When the brush reaches a point near the limit of its return movement where it contacts with the second and third segments, it will be seen that when those segments are covered by and in contact with the brush, there will exist what might be called a magnetic field of longer duration, whereby the armature will be prevented from rotating too far by virtue of its acquired momentum.

When the return movement of the brush is completed, the circuit is broken and there is no consumption of current until the device is again operated.

This is accomplished by the automatic switch and the use of the strip 26ª and by leaving the first segment 27 electrically disconnected.

The operation of the mechanism shown in Fig. 6, is similar to that already described, excepting that the rotation of the motor shaft 20 through the worm 70 imparts rotation to the worm gear 71, thereby operating the pitman 73 for imparting the desired movement to the movable member 13.

It will be seen from the foregoing description that the speed, the direction of operation, the intensity of operation of a mechanical part, such for instance as a brake or a clutch, may be controlled with my mechanism by means of a single lever.

The movable member 13 can be started practically instantly, stopped practically instantly and its direction of motion reversed, by means of the control of the power device and the mechanism operatively connected therewith.

The parts are of comparatively simple and inexpensive construction and the form is shown peculiarly adapted for use on a motor vehicle.

It may be said in this connection, that other forms and parts of the device may be readily made for operating the mechanism under different circumstances and for making other applications of the use thereof.

I believe that I have made a substantial advance in the art by producing a mechanical combination having a movable piece of mechanism, a power plant operatively connected therewith and a single lever, the parts being so arranged and connected that by a movement of the lever in one direction the power plant may be set in operation for moving the movable mechanism to a certain predetermined position and then stopped by stopping any further movement of the lever, and without the manipulation of any other controlling means.

Upon the release of the lever after each movement thereof, the current is automatically cut off, so that there is no waste of electrical energy and no danger of any accidental operation of the machine. The use of the screw locks the movable member in any position to which it may be adjusted until the machine has been manipulated by the operator to affect movement of the movable member 13. By using the notches 53$^b$, it will be noted that when the operator releases his hold on the lever 51, the lever will be held against any movement, and when it is desired to operate the machine again, the lever will be in the same position, with relation to the position of the armature, in which it was when the last prior movement was completed.

It will be understood that some changes may be made in the construction and arrangement of the parts without departing from its essential features and purposes, and it is my intention to cover by this application any such changes which may be included within the scope of my claims.

I claim as my invention:

1. In a device of the class described, the combination of a movable member and a motor operatively connected therewith, a commutator operatively connected with said motor, means for operating the commutator including a lever, the parts being so arranged and connected that by the operation of the lever the motor armature is moved in either direction as desired for any desired distance and at any desired speed, said device including means for automatically opening the electric circuit when the lever is stopped and for closing the circuit when the lever is operated.

2. In a device of the class described, the combination of a movable member and a motor operatively connected therewith, a commutator operatively connected with said motor, means for operating the commutator, including a compound lever, the parts being so arranged and connected that by the operation of the lever, the motor armature is moved in either direction as desired, for any desired distance and at any desired speed, said device including means for automatically opening the electric circuit whenever the lever is released.

3. In a device of the class described, the combination of a movable member, a spring mechanism operatively connected therewith, a screw mechanism operatively connected with said spring mechanism, a power device, a source of electrical energy operatively connected with said power device, an automatic switch interposed between said power device, and source of electrical energy, a commutator operatively connected with said power device, a compound lever for controlling the commutator, a notched quadrant adjacent to said lever, a plain quadrant spaced therefrom, said device including means for yieldingly holding the lever in any one of said notches, said quadrants limiting the direction and extent of movement of said lever, said parts being so arranged that the lever controls the switch and the commutator for controlling the power device, the screw, the spring device and the movable member.

4. In a device of the class described, a movable member, a spring device operatively connected therewith, a screw operatively connected with the said spring device, a motor operatively connected with said screw, a commutator operatively connected with the motor, a lever for controlling said commutator, a source of electrical energy including said commutator and said motor, a switch arranged to automatically move to one position of its movement, operatively connected with said lever, whereby the switch may be moved to another position of its movement, and means for electrically connecting said motor, said commutator, said source of electrical energy and said switch, the parts being so arranged that by the movement of the lever, the circuit is closed, and the commutator actuated for actuating the motor, thereby actuating the screw, and being also so arranged that when the lever is stopped, the screw holds the movable member against further movement and said switch is automatically operated for breaking the circuit.

5. In a device of the class described, a movable member, a motor operatively connected therewith, a commutator operatively connected with the motor, a compound lever having parts operatively connected together, one of said parts being connected with a movable member of the commutator for operating the same, a source of electrical energy, means for connecting said source of electrical energy with said commutator and said motor, and including a switch, said switch being adapted to automatically move to and stand in one position of its movement, the other part of said lever being operatively connected with said switch for closing the circuit when the lever is operated, and means for controlling the movement of said lever, whereby the lever must be operated for closing the circuit before it is operated for moving the commutator member with which it is connected.

Des Moines, Iowa, March 11, 1916.

ALSON C. SARGENT.